Oct. 26, 1965   R. R. BALAGUER   3,214,299
BATTERY CONSTRUCTION
Filed Sept. 27, 1963   5 Sheets-Sheet 1

Oct. 26, 1965     R. R. BALAGUER     3,214,299

BATTERY CONSTRUCTION

Filed Sept. 27, 1963                        5 Sheets-Sheet 5

United States Patent Office

3,214,299
Patented Oct. 26, 1965

3,214,299
BATTERY CONSTRUCTION
Rodolfo Rodriguez Balaguer, Fort Lauderdale, Fla., assignor, by mesne assignments, to Patent Holding Corporation, Fort Lauderdale, Fla., a corporation of Florida
Filed Sept. 27, 1963, Ser. No. 312,049
19 Claims. (Cl. 136—107)

The present invention relates to primary batteries, and more particularly to dry cell batteries of the so-called inside out type in which the carbon cathode electrode forms the battery outer shell.

This is a continuation-in-part of copending United States patent application Serial No. 260,270, filed February 21, 1963.

In United States Patent 2,903,499, which issued September 8, 1959, to Rodolfo Rodriguez Balaguer, there is described and claimed a dry cell battery construction in which the cathode electrode (or more properly the "positive electrode") is formed by a carbon cup and a carbon rod projecting from the base of the cup along the longitudinal axis of the cup. The anode electrode is formed by an annular metal sheet disposed between the rod and the cup and which is substantially concentric therewith. The space within the carbon cup, on both the inside and outside of the anode cylinder, is filled, except for the desired air space, with the battery mix material, i.e., the depolarizing agent, electrolyte and any other chemicals which may be mixed therewith. The annular anode is separated from the battery mix by a bibulous separator, e.g., a paper or starch covering on the anode.

This type of battery construction has been found to be particularly well suited to the so-called magnesium cell in which magnesium is used as the anode metal and the battery mix is selected accordingly to provide the desired electrochemical system.

It has been recognized that magnesium cells afford a number of advantages which are highly desirable, e.g., a high watt-hour output per battery volume and weight, a long shelf life, good low temperature characteristics and a high operating voltage. But serious problems have been encountered in making practical magnesium batteries which have largely prevented their commercial exploitation. Notable among these problems is that resulting from volumetric expansion of the magnesium anode which occurs as the magnesium metal enters into the chemical reactions with the battery mix. Typically, this volumetric expansion will be about 50%. With batteries constructed to provide a maximum of useful power for a particular battery size and operated so as to realize the power output capabilities, the expansion which occurs as the magnesium reacts with the battery mix has been so great that the battery case breaks or ruptures, rendering the cell of no further use.

Another important problem which has been encountered with magnesium cells is that of delay time, i.e., the time required for the cell voltage to return to a predetermined proportion of open cell voltage after the cell is placed in a closed circuit. Thus, a magnesium cell will usually suffer a sharp drop in voltage as soon as placed in a closed circuit, and the voltage will gradually return to its normal intended closed circuit value. Typically, the delay time is measured as the time required for the cell voltage to rise to one volt. At normal room temperatures, the delay time for a magnesium cell is usually relatively short. However, at low temperatures, e.g., —20° F., the delay time may be quite long, delay times of many minutes not being unusual.

The principal object of the present invention has been the provision of a novel and improved dry cell battery construction.

An important object of the invention has been the provision of a novel and improved bibulous separator or coating for dry cell battery anodes.

Another object of the invention has been to provide a novel and improved magnesium cell construction which minimizes the problems of cell expansion resulting from magnesium expansion.

Still another object of the invention has been to provide a novel and improved magnesium cell construction which minimizes the problem of delay time.

Still another object of the invention has been the provision of a novel and improved magnesium cell construction in which cells manufactured under like conditions exhibit closely comparable performance characteristics.

A further object of the invention has been the provision of a novel and improved magnesium cell having a high shelf life.

Another object of the invention has been the provision of a novel and improved magnesium cell which exhibits improved performance characteristics as regards amperage and capacity.

Another object of the invention has been the provision of a novel and improved magnesium cell which resists drying out in storage and service.

A further object of the invention has been the provision of a magnesium battery construction exhibiting improved characteristics of anode corrosion uniformity.

Still another object of the invention has been the provision of a dry cell battery construction which is relatively easy to assemble with automated techniques.

A further object of the invention has been the provision of a novel and improved dry cell battery construction using a hollow cylindrical anode in which the problem of internal short circuits resulting from assembly pressure is minimized or eliminated.

The principles of the invention have been found to be of particular importance to magnesium cells and hence the invention will be described largely in connection with such cells. However, the principles of the invention are applicable also to zinc cells and to cells using other electrochemical systems.

Other and further objects, features and advantages of the invention will appear more fully from the following description of the invention taken in connection with the appended drawings, in which.

Figure 1:
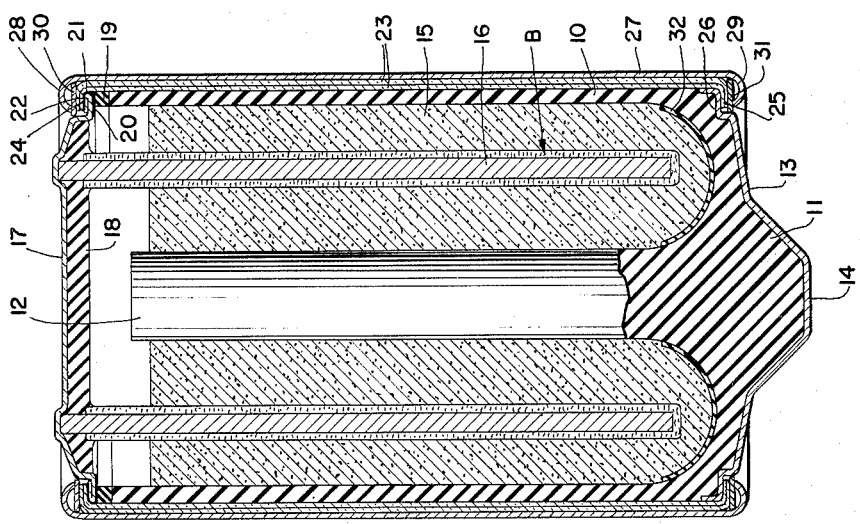
FIG. 1 is a longitudinal sectional view of a dry cell battery construction embodying the invention.

Referring now to the drawings and more particularly to FIG. 1, there is shown a dry cell battery having a cathode structure comprising a cylindrical carbon cup 10 having a closed end or base 11 and a central carbon rod 12 projecting upwardly from cup base 11. The cup 10, base 11 and rod 12 are integral, but if desired the rod 12 may be made separately and inserted in a corresponding aperture in base 11. A metal cap 13 having a contact forming boss 14 is provided over base 11.

The cup 10, base 11 and rod 12 may be formed of a molded green carbon, as described in the aforementioned patent. Preferably, the molding composition will be formed in accordance with the teachings of Rodolfo Rodriguez Balaguer United States patent application Serial No. 208,096, filed July 6, 1962.

The annular space between the cup 10 and the central rod 12 is filled with battery mix 15. The space within cup 10 above the free end of rod 12 is usually reserved as an air space into which may flow liquid exuded upon discharge of the cell. In some cells this air space may be quite small and may even be substantially eliminated.

A hollow cylindrical anode 16 is inserted into the battery mix with one end being adjacent but spaced from base 11 and the other end projecting beyond the free end of cup 10. A bibulous covering or separator B is provided on both sides of anode 16 to prevent direct contact between the anode and the battery mix, as will be described in detail below.

An end cap 17 is soldered to the outer end of anode 16 and forms a part of the cell closure and also one of the battery terminals. The inner surface of end cap 17 is preferably covered with an asphalt or similar protective coating or layer 18. The bibulous covering B extends a short distance into layer 18 on both the inside and outside of anode 16. The soldering of the anode 16 to end cap 17 and the formation of protective layer 18 are preferably effected in accordance with the teachings of Rodolfo Rodriquez Balaguer United States patent application Serial No. 146,505, filed October 20, 1961.

A cardboard or similar washer 19 lies on the free end of cup 10 and separates the cup 10 physically and electrically from cap 17. A flat shoulder 20 of cap 17 lies against the opposite surface of washer 19. The outer edge of cap 17 is folded back to overlie directly the shoulder 20, as shown at 21. The edge of end cap 17, i.e., the shoulder 20 and the surface 21, is preferably coated with an asphalt layer similar to that used for layer 18, as shown at 22. However, the layer 22 will usually be much thinner than the layer 18. The layer 22 may conveniently be applied to the cap portions 20 and 21 by dipping the same in a bath of molten asphalt before the portion 21 is bent into the position overlying shoulder 20.

One or more layers of fiberglass tape 23 are wrapped around the outside of cup 10 as a reinforcing cylinder, and the ends of the tape are bent over, as shown at 24 and 25, so as to contact the annular surface 22 of end cap 17 and an annular shoulder 26 of cap 13, respectively. The tape 23 is preferably of the pressure-sensitive type with an adhesive coating on one side and a smooth surface on the other side, for example, a 0.01" thick fiberglass tape. The adhesive side of the tape 23 contacts the battery cup. Other substantially inelastic reinforcing wrappings may be used in place of the tape 23, for example, the fiberglass thread or steel wire described in copending Balaguer United States patent application Serial No. 260,166, filed February 21, 1963. However, the fiberglass tape is preferred since the structure of the tape affords resistance to axial expansion of the cell as well as resistance to radial expansion. Where a fiberglass tape is used, it has been found preferable to use two layers of the tape wound tightly around the wall of cup 10.

A cylindrical steel jacket 27 surrounds tape 23 and assists tape 23 in resisting both axial and radial expansion of the cell. The ends of jacket 27 are bent inwardly along smooth curves, as shown at 28 and 29. The ends of sections 28 and 29 contact the outer surfaces of insulating washers 30 and 31, respectively, and act to retain the washers 30 and 31 in intimate contact with tape end sections 24 and 25, respectively. The tape 23 affords good electrical insulation between cup 10 and steel jacket 27. Typically, the jacket 27 might be made from sheet steel 0.008" thick.

For reasons discussed below, it will be desirable in certain cases to inhibit electrochemical action between the carbon cup base and the adjacent free end of the anode 16. For this purpose, an insulating layer 32 may be provided along the bottom surface of the annular space between cup 10 and rod 12. The layer 32, which might be formed of asphalt or the like or as an annular sheet of insulating material, extends axially to a point slightly beyond the adjacent end of anode 16.

The anode 16 may be formed from magnesium or a magnesium alloy and typically might be 0.050"–.065" thick and be rolled into a cylinder having a ⅞" outside diameter. The foregoing and other dimensions set forth herein are given only by way of illustration and refer to a nominal size "D" cell.

The battrey mix 15 may be of any type suited to the anode metal selected. A typical battery mix composition for use with a magnesium anode is the following, percentages being by weight:

88% type M manganese dioxide (synthetic) chemical ore
1% $Mg(OH)_2$
3% $BaCrO_4$
8% acetylene black wet 550 ml./1000 g. with
    250 g./l. $Mg.Br_2^+$
    0.25 g./l. $Na_2CrO_4$ The dry cell battery shown in FIG. 1 may typically correspond substantially to the standard "D" size, and have an outside diameter of about 1.356". The diameter of rod 12 might be 5/16", while the diameter of cup 10 might be 1.290" and the thickness of the walls of cup 10 might be 1/32".

In making dry cell batteries, it has been customary to provide a bibulous coating on the metallic anode to prevent direct contact between the anode and the battery mix. A paper wrapping around the anode has been the most common form of bibulous coating or separator, although starch has been used for this purpose, as shown in Balaguer United States Patent 2,893,899, granted July 7, 1959. An important aspect of the present invention has been the provision of an improved bibulous coating or separator, designated B in FIG. 1.

The bibulous separator B of the invention comprises one or more layers of a compressible foraminous material coated on both surfaces with a hygroscopic starch gel. The gel also fills the interstices of the foraminous carrier. Many fabrics may be used as a carrier, but best results have so far been obtained using an ordinary U.S.P. surgical gauze bandage.

Figure 2:
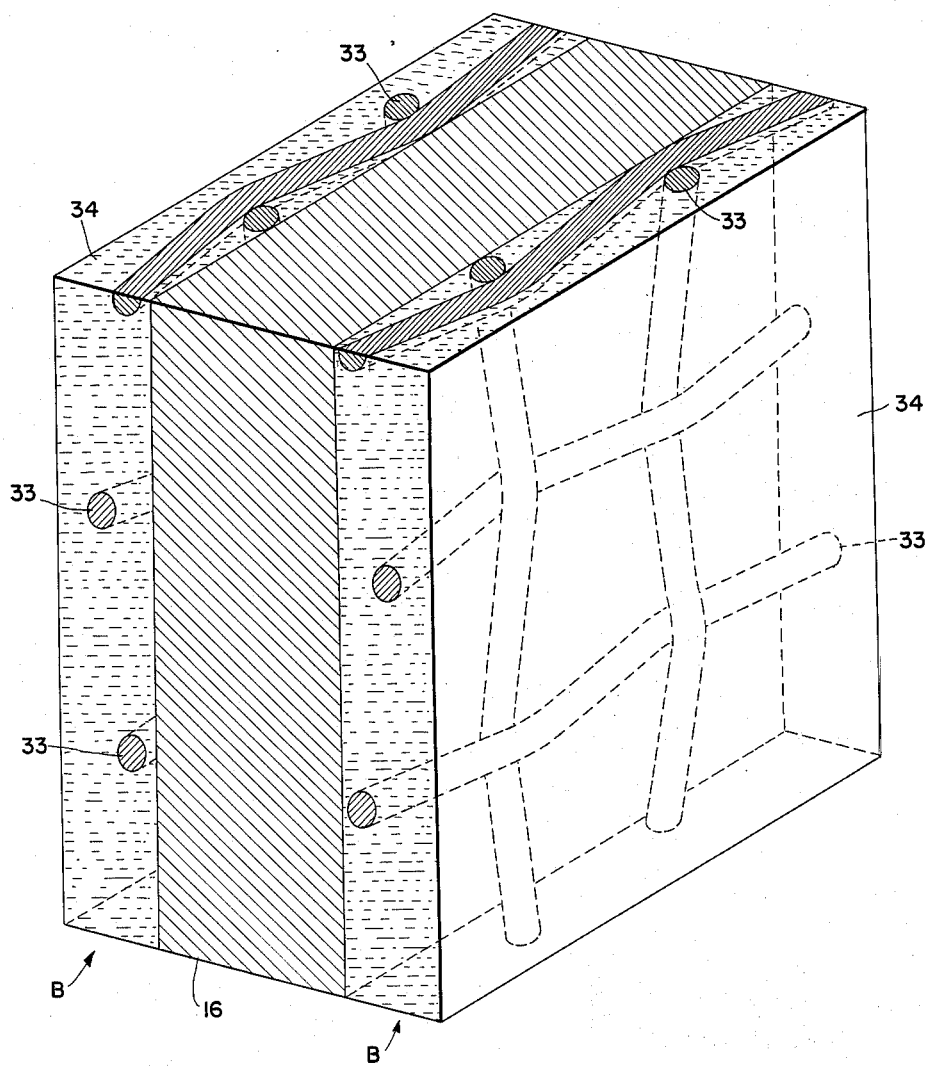
FIG. 2 is a sectional view, greatly enlarged, of a segment of the anode of FIG. 1 illustrating in detail the bibulous separator on the anode.

FIG. 2 shows, in greatly enlarged form, a small segment of anode 16 covered on both sides with the bibulous separator B. The separator comprises a single layer (on each side of the anode) of gauze 33 and a starch gel 34 surrounding the gauze and filling the interstices thereof. Typically, the anode 16 might be 0.065" thick and each gauze-gel layer might be 0.013" thick, yielding a total thickness of 0.091". At certain points the gauze yarns may be in contact with the anode except for a very thin layer of starch, while at other points the yarns may be spaced from the anode by a distance equal to the yarn thickness. A relatively thick layer of starch is located on the outside of the gauze; typically, this layer might have a minimum thickness of 0.005".

Figure 3:
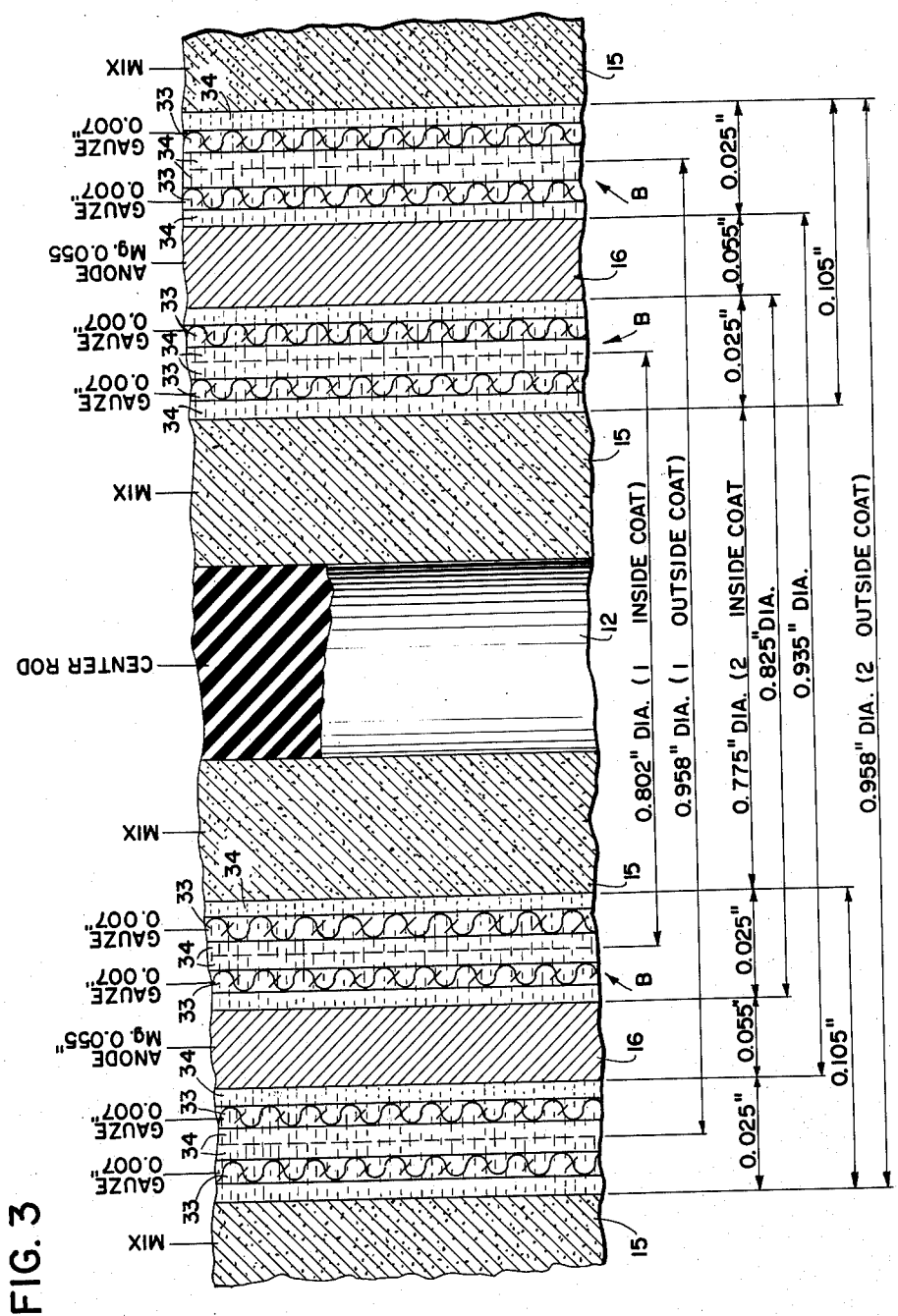
FIG. 3 is an enlarged fragmentary sectional view of the dry cell battery of FIG. 1 illustrating a modified bibulous separator.

In FIG. 3 there is illustrated a magnesium cell construction using two layers of gauze and starch for the bibulous separator B. Typical dimensions for a nominal "D" size cell are shown in FIG. 3.

The starch gel coated on the gauze should be hygroscopic so that it will absorb moisture in service rather than tending to dry out. The starch gel is preferably one which forms, i.e., gels, at normal room temperature, without heating or cooling, and preferably is made with electrolyte rather than water. A starch gel which has been found desirable in the practice of the invention may be prepared by mixing together, at a room temperature of 92° F., 0.5 gram of wheat flour, 1.0 gram of wheat starch, and 8.0 cc. of electrolyte. The electrolyte may be prepared by dissolving magnesium bromide and lithium chromate in distilled water in the proportions of 400 grams/liter of $MgBr_2$ and 0.2 gram/liter of $LiCrO_4$. Another example of an electrolyte would be one formed by dissolving in distilled water 400 grams/liter of $Mg(ClO_4)_2$ and 0.2 gram/liter of $LiCrO_4$. Where an anode metal other than magnesium is used, the electrolyte should correspond to the corresponding electrochemical system. Thus, for a zinc anode the electrolyte used for the starch gel might be prepared by dissolving ammonium chloride and zinc chloride in distilled water. In any event, the electrolyte should be compatible with the battery electrochemical system.

The specific gravity of the electrolyte has a significant effect on gel formation. For example, varying the concentration of magnesium bromide in the $MgBr_2$–$LiCrO_4$ electrolyte described above to obtain the following specific gravities yielded the following results with the starch-electrolyte mixture described.

| Electrolyte specific gravity: | Time required for gel to set |
|---|---|
| 1.300 | 3 minutes. |
| 1.275 | 15 minutes. |
| 1.250 | 90 minutes. |
| 1.225 | No gel formed after 48 hours. |
| 1.200 | No gel formed after 48 hours. |

Figure 4:
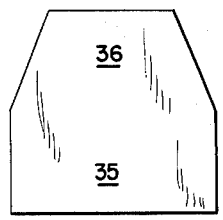
FIG. 4 is a plan view illustrating a gauze blank for use in the bibulous separator for the battery of FIG. 1.

In making the battery, the gauze may conveniently be cut in the shape shown in FIG. 4 with a rectangular section 35 surmounted by a trapezoidal section 36. For an anode for a "D" size cell having an anode outside diameter of 0.935", the base of rectangle 35 might be 3½", the height of rectangle 35 might be 1¹⁵⁄₁₆", the overall height of the blank might be 3¾", and the short base of trapezoidal section 36 might be 2¾" long.

Starch gel is applied to both sides of the gauze blank in such a manner as to provide a coating on both sides and to fill the interstices between the gauze yarns. Typically, a roller may be used for this purpose, first applying the gel to one side and then to the other. The gauze is then wrapped around the anode cylinder so as to cover all parts of the anode except the terminal portion of the open end which is subsequently to be soldered to the base 17.

Figure 5:
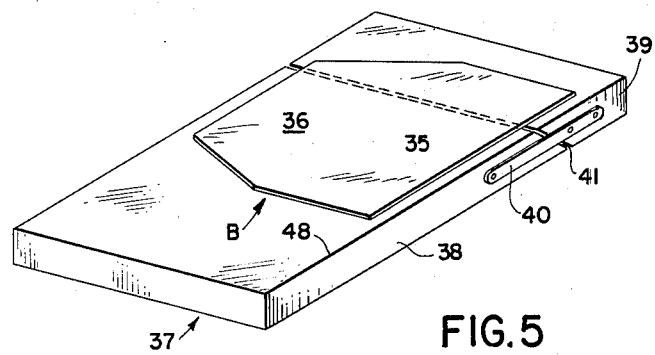
FIG. 5 is an isometric view of apparatus for assembling the gauze blank of FIG. 4 and the anode cylinder.
Figure 6:
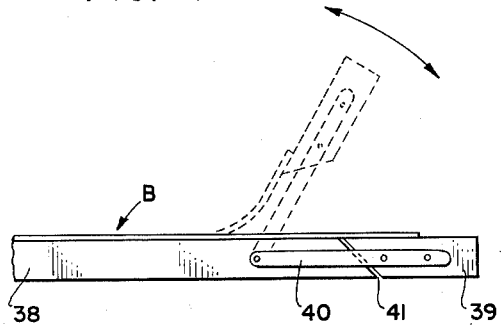
FIG. 6 is a side elevational view of the apparatus of FIG. 5.
Figure 8:
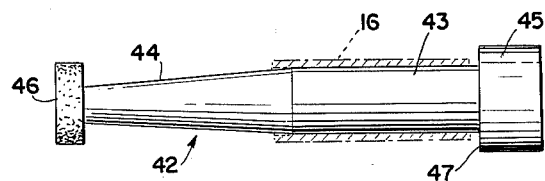
FIG. 8 is a side elevational view of a mandrel for use with the apparatus of FIGS. 5 and 6.

Wrapping of the starch gel carrying gauze on the anode cylinder is greatly facilitated by using the method and apparatus illustrated in FIGS. 5–13. Referring particularly to FIGS. 5 and 6, the apparatus comprises a flat bed 37 divided into a stationary portion 38 and a movable portion 39. The portion 39 is pivotally mounted to the stationary portion 38 by arms 40 at each side, permitting portion 39 to be pivoted to the dotted line position shown in FIG. 6. The facing edges of the bed portions 38 and 39 are inclined as shown at 41.

The gauze blank B is placed on bed 37 with the base of rectangular portion 35 parallel to a side edge of the bed and with a minor portion of the blank resting on the movable portion 39, the remainder resting on portion 38.

Figure 7:
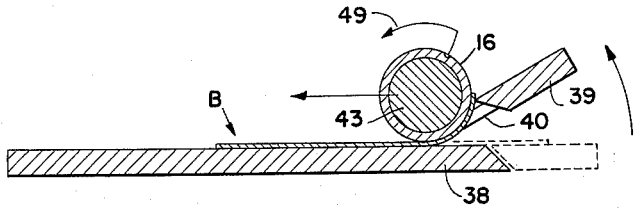
FIG. 7 is a sectional view illustrating the operation of the apparatus of FIGS. 5 and 6.

A mandrel 42 on which is mounted an anode cylinder 16 is placed on bed 37 so that the axis of the mandrel is transverse to the length of the bed, as shown in FIG. 7.

The mandrel 42 comprises a cylindrical portion 43, a tapered portion 44, a cylindrical head 45 and a cylindrical base or disk 46. The base 46 may be made of a spongy material such as sponge rubber, while the rest of the mandrel is preferably made of a metal which will not be attacked by the electrolyte in the starch gel coating on blank B.

Anode cylinder 16 is placed on cylindrical portion 43, the fit being sufficiently tight that cylinder 16 rolls with mandrel 42 as the latter is rolled along bed 38. The mandrel is placed on the bed 37 with the mandrel axis parallel to and approximately overlying the line of juncture between bed portions 38 and 39. Inner edge 47 of mandrel head 45 contacts side edge 48 of bed 37, which positions anode cylinder 16 over rectangular portion 35 of blank B and tapered portion 44 of mandrel 42 over trapezoidal portion 36.

With the mandrel positioned over blank B, bed portion 39 is pivoted as shown in FIG. 7 to lift the corresponding portion of blank B off the bed and into contact with the anode cylinder and mandrel. The mandrel and anode are then rotated along bed 37 in the direction shown by the arrow 49 in FIG. 7, wrapping the blank B around the anode and mandrel. The width of blank B is somewhat greater than the circumference of anode 16, resulting in some overlap. For example, with an anode circumference of about 2.94", the maximum width of blank B might be 3.5".

Figure 9:
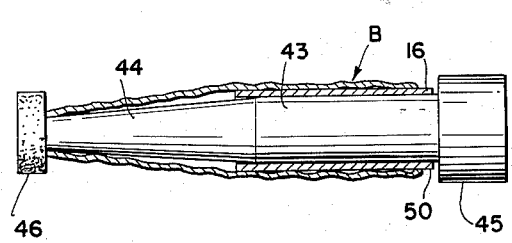
FIGS. 9 and 10 are diagrammatic views illustrating the operation of the mandrel of FIG. 8.

Blank B is positioned on bed 37 so that the base or bottom edge of the blank will be positioned inwardly of the adjacent edge of anode cylinder 16, leaving a short length of the anode cylinder exposed, as shown at 50 in FIG. 9. The upper edge of blank B contacts cylindrical base 46, as shown in FIG. 6.

Figure 10:
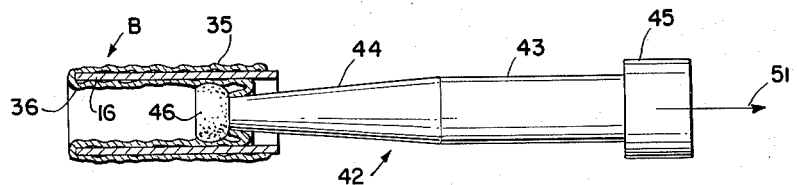
Figure 11:
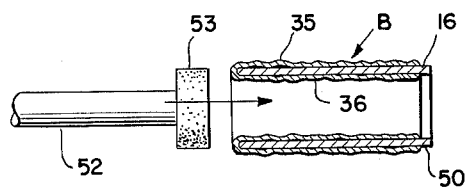
FIGS. 11 and 12 are diagrammatic views illustrating the operation of smoothing the inner gauze covering on the anode cylinder.

With the blank B fully wrapped around the anode and mandrel, the anode and blank are held either manually or in a suitable clamp, and the mandrel is withdrawn from the anode and blank by being moved in an axial direction, as shown by arrow 51 in FIG. 10. As the mandrel is moved axially, the spongy disk 46 draws the portion 36 of blank B along the inside of anode cylinder 16, as shown in FIG. 10. When the mandrel 42 is completely withdrawn, the anode is completely covered by the blank B except for the portion 50, as shown in FIG. 11.

Figure 12:
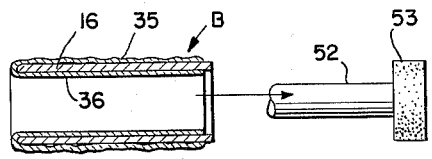
Figure 13:
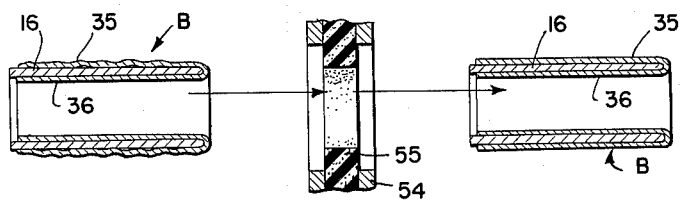
FIG. 13 is a diagrammatic view illustrating the operation of smoothing the outer gauze covering on the anode cylinder.

The blank B on both the inside and outside of anode 16 will be somewhat wrinkled. The blank covering on the inside of anode 16 is ironed by passing a plunger 52 through the anode cylinder, as shown in FIGS. 11 and 12. Plunger 52 carries a disk 53 of spongy material, e.g., sponge rubber. The diameter of disk 53 is somewhat greater than that of disk 46 and exerts substantial pressure on blank B, resulting in a smooth, even adherence of the blank to the inside surface of the anode cylinder. The portion of blank B contacting the outside of anode cylinder 16 is similarly ironed and caused to adhere smoothly to the anode surface by passing the anode cylinder through a female die 54 having a ring 55 of spongy material. The internal diameter of ring 55 is slightly less than that of the anode cylinder so that contact between the blank B and the ring 55 produces the desired ironing action, as shown in FIG. 13. The relative motion between the anode cylinder and the spongy material (disk 53 or ring 55) should always be in a direction such that the spongy material first contacts that edge of the anode cylinder which is covered by blank B. Otherwise, the smoothing action might tend to strip the blank off the anode cylinder. The ironing action described results in a substantially uniform contact of the blank B with all parts of the anode surface, which is highly desirable for battery operation.

The starch gel coating on blank B is dried out after the blank is mounted on the anode cylinder. The drying may conveniently be effected with infrared heat lamps. The anode is then soldered to the metal bottom closure 17, preferably as described in the aforementioned United States patent application Serial No. 146,505, filed October 20, 1961.

The anode cylinder with bottom closure attached is then forced into position through the mass of battery mix 15 in a battery cathode cup 10. The hard surface afforded by the dried starch coating on the gauze covering the anode facilitates forcing the anode through the battery mix and inhibits the tendency for the starch to be stripped off by contact with the mix. The starch gel being hygroscopic, as soon as the starch gel is in the battery mix it starts to absorb moisture therefrom and soon regains its soft gel consistency. The insertion of the anode into the mix may desirably be performed as described and claimed in the copending United States patent application of Rodolfo Rodriguez Balaguer, Serial No. 213,237, filed July 30, 1962. The dried starch gel should be maintained in substantially its dried condition until inserted in the battery mix since if left exposed to a humid atmosphere for an extended period the hygroscopic nature of the gel will cause it to absorb moisture and become soft.

For a double gauze separator, as shown in FIG. 3, two layers of starch gel coated gauze may be placed on bed 37 and be wrapped simultaneously, or the wrapping procedure may be carried out first for one gauze blank and then be repeated for the second gauze blank.

It has been found that the gauze-starch gel bibulous separator produces a significant improvement in the delay time characteristic of a magnesium cell. This improvement is most marked for a double gauze separator with electrolyte starch, but is also readily noticeable in the cases of a single gauze separator with electrolyte starch and either a double or single gauze separator with water starch. A water starch gel may be prepared with the same starch as used for an electrolyte starch gel, but heating is required for gel formation.

As mentioned previously, when a magnesium battery is put into service, the resulting chemical reactions cause the magnesium anode to expand, actually becoming substantially thicker, because the magnesium oxide which is formed has a greater volume than the metallic magnesium. The exact expansion to be expected at any one time is difficult to calculate because it is affected by various factors. It appears that the oxide formation and hence the expansion is largely controlled by the power output of the cell so that expansion is a more serious problem with light drain-long service applications than in the case of heavy drain-short service applications. Initially, the magnesium expansion is accommodated by compression of the battery mix and, to a limited extent, by movement of the battery mix into the air space, if such space be provided. After the initial period, the expansion is observable as a swelling of the cell, i.e., an increase in outside diameter, which, if it continues, results in a breakage or rupture of the cell outer wall.

Where a magnesium cell is utilized in a light drain-long service application, the magnesium expansion encountered is usually approximately 50%. Thus, where the anode wall is 0.065" thick for a fresh cell, the anode wall thickness when the cell is discharged may be increased by about 0.0325". The total anode wall thickness, considered along a diameter, will be increased by about twice this or 0.065", so that the anode will require about 0.13" along a diameter, of which 0.065 represents expansion.

With a gauze-starch separator as shown in FIG. 2, the separator may have an initial thickness (for gauze and starch) of about 0.013", of which the gauze occupies about 0.008" and the starch about 0.005". Since there are four layers of separator along a diameter, there will be about 0.032" of gauge and 0.02" of starch initially. As the magnesium expands in service, the gauze may be compressed about 75% in thickness to a value of about 0.002" for each layer, or a total gauze thickness of about 0.008".

The starch cannot be compressed to zero thickness by dissipation of fluid content into the cell because the starch gel has some solid content, usually about 16%. However, for simplicity, the starch coating may be considered to be completely eliminated as a result of compression stresses, which results in a thickness available to accommodate anode expansion of 0.02".

Compression of both the gauze and the starch thus affords an expansion chamber of about 0.044", which is about 68% of the 0.065" of anode expansion to be accommodated. The balance of the anode expansion may be accommodated by radial compression of the battery mix, longitudinal expansion of the battery mix, and to a slight extent, by radial expansion of the carbon cup 10. Radial expansion stresses may also be accommodated by providing a hollow center rod 12, as described in the aforementioned United States application Serial No. 260,270.

With a construction as shown in FIG. 3, the magnesium anode is initially 0.055" thick, so that the total anode expansion to be accommodated is about 0.055". The gauze initially may be considered to be .007" thick (each layer). A reduction in thickness of each gauze layer to 0.004" may be conservatively estimated, leaving 0.003" of each gauze layer for expansion. The actual gauze compression will, of course, depend on the compression stresses, and if the stresses are allowed to increase sufficiently the gauze may compress to a thickness of as little as 0.002". The initial gauze thickness will depend to some extent on the compacting of the mix into which the gauze-wrapped anode is inserted.

Each double layer of gauze and starch, of which there are four in FIG. 3, has an initial thickness of about 0.025", for a total thickness of about 0.1". Each double layer of gauze will compress to a thickness of about 0.008", so that the expansion space provided by each such double layer will be 0.025"−0.008"=0.017". The total expansion space for four double layers will thus be about 0.068". The magnesium anode expansion will be about 0.055", which is less than the indicated expansion space. On the other hand, the actual expansion space afforded by compression of the bibulous separator will be somewhat less than the indicated value by reason of the solid matter present in the starch gel, e.g., about 16%.

Figure 14:
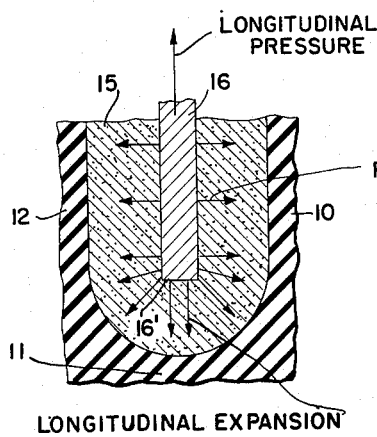
FIGS. 14 and 15 are simplified diagrammatic sectional views of a battery illustrating a longitudinal expansion problem and its solution in accordance with the invention.

Excessive longitudinal or axial expansion of a battery is undesirable since it will tend to open the base seal and cause drying out of the battery. Longitudinal expansion of a magnesium anode has been found to result in such excessive longitudinal expansion. Longitudinal expansion of a magnesium cylindrical anode is a part of the overall volumetric expansion but would not be a serious problem except for the fact that magnesium corrosion tends to be greatest at the anode edge, i.e., at the edge designated 16′ in FIGS. 14 and 15.

The volumetric expansion resulting from the corrosion at the edge 16′ creates a longitudinal pressure which in turn creates a longitudinal expansion of the anode. This longitudinal expansion of the anode will largely be in an upward direction, i.e., away from the cup base 11, because, when the anode 16 is inserted in the battery mix 15, the mix below the anode 16 will be compressed more than the remainder of the mix and hence will resist further intrusion of the anode under expansion stresses. Shortening the anode 16 will not eliminate this problem, since there will still be a highly compressed mix between the end of the anode and the cup base 11.

Figure 15:
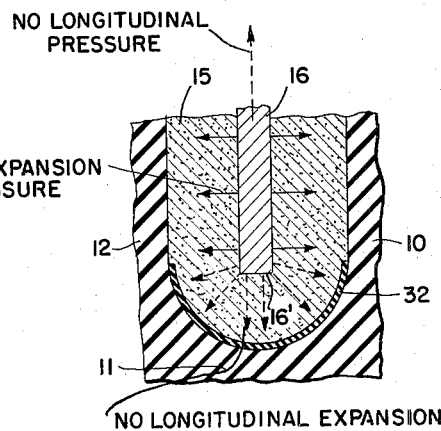

The layer of insulation 32 along the cup base, as shown in FIGS. 1 and 15, largely prevents electrochemical action involving the edge 16′ of anode 16 and hence largely eliminates the longitudinal expansion problem resulting from volumetric expansion of the anode edge. The layer 32 should extend upward (away from cup base 11) to a point slightly above the edge 16′ of anode 16. Typically, for a size "D" cell the layer 32 should extend about 1/16" beyond the end 16′.

Figure 16:
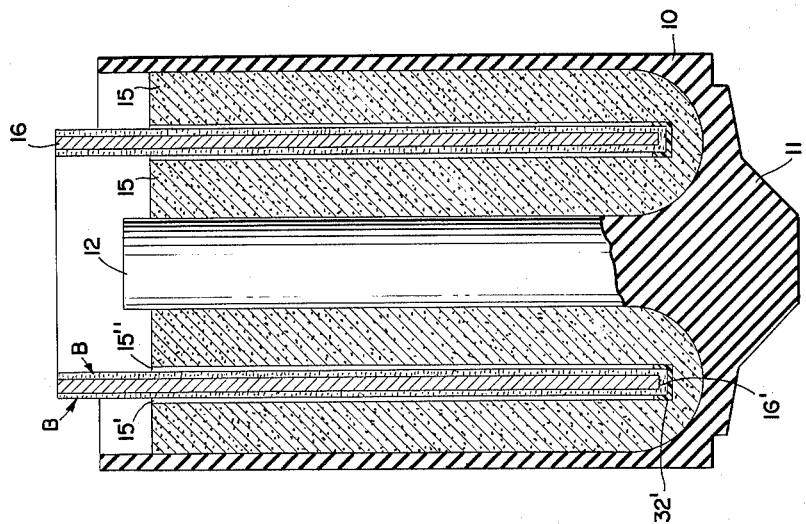
FIG. 16 is a simplified longitudinal sectional view similar to FIG. 1 but showing a modification of the construction according to the invention.

Instead of (or in addition to) providing the insulating layer 32, an annular insulating ring or washer 32' may be mounted on the end of anode 16 so as to prevent or minimize electrochemical action between the end 16' and mix 15, as shown in FIG. 16. The ring 32' fits tightly over the gauze-starch separator B overlying the end of anode 16 and may have an axial length of about 1/16". The ring 32' may be made from any suitable electrical insulating material which is also impervious to the anode mix. A suitable material is an extruded acrylic butadiene styrene plastic, which typically might be 0.008" thick.

The ring 32' performs another function that is particularly important for zinc cells. Thus, when the anode 16 is inserted into the mass of battery mix 15, the mix in front of the leading edge 16' of the anode is compressed and as a result some of the battery mix is forced through the interstices of the gauze B and into actual contact with the anode metal at and near the edge 16'. This actual contact between the metal and the mix results in a localized short circuit. The effect is apparently not of great significance in a magnesium cell because as the magnesium anode starts to corrode a thin film of oxide forms which substantially reduces the short circuit current. However, in the case of a zinc cell, no such protective coating is formed on the zinc anode, and the cell voltage tends to drop off suddenly due to the short circuit. The ring 32' prevents the battery mix from penetrating the gauze surrounding the anode leading edge.

As the anode 16 with the ring 32' is forced through the mix 15, annular openings 15' and 15" are formed on the sides of the anode. These openings will promptly fill with liquid from the battery mix and hence will not interfere with cell operation.

While the invention has been described in connection with specific embodiments thereof and in specific uses, various modifications thereof will occur to those skilled in the art without departing from the spirit and scope of the invention as set forth in the appended claims.

What is claimed is:

1. A dry cell battery, comprising a carbon cup having a hollow body, a closed end and an open end, a carbon rod projecting from said closed end and disposed generally along the longitudinal axis of said cup and being electrically connected thereto, said cup and said rod forming a cathode structure, a hollow cylindrical metallic anode disposed between said rod and said cup and being concentric therewith, closure means for said open end of said cup, battery mix contained in the space between said anode and said cup and said rod to react chemically with said anode when said anode and said cathode structure are electrically connected through an external circuit, said chemical reaction producing a substantial increase in the volume of said anode thereby producing a transverse stress tending to rupture said cup, reinforcing means surrounding said body of said cup and arranged to resist the rupturing force exerted on said body upon said increase in volume of said anode, and a bibulous separator covering said anode and arranged to prevent direct contact between said anode and said mix, said bibulous separator comprising a layer of a compressible, foraminous textile material coated on both sides and having the foramina filled with a hygroscopic starch gel formed by mixing starch and an electrolyte solution compatible with the electrochemical system of said battery, said bibulous separator being compressible under said transverse stress thereby to accommodate at least a substantial proportion of said transverse stress.

2. A dry cell battery, comprising a carbon cup cathode having a hollow body, a closed end and an open end, a metallic anode disposed within said cup, battery mix contained in the space between said anode and said cup to react chemically with said anode when said anode and said cup are electrically connected through an external circuit, and a bibulous separator covering said anode and arranged to prevent direct contact between said anode and said mix, said bibulous separator comprising a layer of a compressible, foraminous textile material coated on both sides and having the foramina filled with a starch gel.

3. A dry cell battery as set forth in claim 2 in which said starch gel is hygroscopic.

4. A dry cell battery as set forth in claim 3 in which said starch gel is formed by mixing starch and an aqueous electrolyte solution compatible with the electrochemical system of said battery.

5. A dry cell battery as set forth in claim 4 in which said textile material is a cotton gauze.

6. A dry cell battery, comprising a carbon cup having a hollow body, a closed end and an open end, a carbon rod projecting from said closed end and disposed generally along the longitudinal axis of said cup and being electrically connected thereto, said cup and said rod forming a cathode structure, a hollow cylindrical metallic anode disposed between said rod and said cup and being substantially concentric therewith, closure means for said open end of said cup, battery mix contained in the space between said anode and said cup and said rod to react chemically with said anode when said anode and said cathode structure are electrically connected through an external circuit, and a bibulous separator covering both sides of said anode and arranged to prevent direct contact between said anode and said mix, said bibulous separator comprising a layer of a compressible, foraminous textile material coated on both sides and having the foramina filled with a hygroscopic starch gel.

7. A dry cell battery as set forth in claim 6 in which said starch gel is formed by mixing starch and an electrolyte solution compatible with the electrochemical system of said battery.

8. A dry cell battery as set forth in claim 7 in which said electrolyte is formed from the same constituents as the electrolyte in said battery mix.

9. A dry cell battery, comprising a carbon cup having a hollow body, a closed end and an open end, a carbon rod projecting from said closed end and disposed generally along the longitudinal axis of said cup and being electrically connected thereto, said cup and said rod forming a cathode structure, a hollow cylindrical metallic anode disposed between said rod and said cup and being substantially concentric therewith, closure means for said open end of said cup, battery mix contained in the space between said anode and said cup and said rod to react chemically with said anode when said anode and said cathode structure are electrically connected through an external circuit, and a bibulous separator covering both sides of said anode and arranged to prevent direct contact between said anode and said mix, said bibulous separator comprising first and second superposed layers of a cotton gauze material, each layer of said material being coated on both sides and having the interstices thereof filled with a hygroscopic starch gel.

10. A dry cell battery, comprising a carbon cup having a hollow body, a closed end and an open end, a carbon rod projecting from said closed end and disposed generally along the longitudinal axis of said cup and being electrically connected thereto, said cup and said rod forming a cathode structure, a hollow cylindrical metallic anode disposed between said rod and said cup and being substantially concentric therewith, closure means for said open end of said cup, battery mix contained in the space between said anode and said cup and said rod to react chemically with said anode when said anode and said cathode structure are electrically connected through an external circuit, a bibulous separator covering said anode and arranged to prevent direct contact between said anode and said mix, said bibulous separator comprising a layer of a compressible, foraminous textile material coated on both sides and having the foramina filled with a starch gel, and an annular insulating cap surrounding the end of said anode adjacent said closed end of said cup, said cap preventing battery mix from being forced through said material and into contact with said end of said anode while said anode is being forced through said battery mix.

11. A dry cell battery, comprising a carbon cup having a hollow body, a closed end and an open end, a carbon rod projecting from said closed end and disposed generally along the longitudinal axis of said cup and being electrically connected thereto, said cup and said rod forming a cathode structure, a hollow cylindrical metallic anode disposed between said rod and said cup and being substantially concentric therewith, closure means for said open end of said cup, battery mix contained in the space between said anode and said cup and said rod to react chemically with said anode when said anode and said cathode structure are electrically connected through an external circuit, a bibulous separator covering said anode and arranged to prevent direct contact between said anode and said mix, said bibulous separator comprising a layer of a compressible, foraminous textile material coated on both sides and having the foramina filled with a starch gel, and insulating means on the inside of said closed end of said cup, said insulating means extending axially along the internal walls of said cup at least to a point beyond the end of said anode adjacent said closed end of said cup, said insulating means preventing a direct flow of current between said closed end of said cup and said end of said anode.

12. A bibulous separator for a dry cell battery having a metallic anode and a quantity of battery mix intended to react chemically with said anode, comprising a layer of a compressible foraminous textile material covering said anode and having a coating of a starch gel, said starch gel filling the foramina in said material.

13. A bibulous separator for a dry cell battery having a metallic anode and a quantity of battery mix intended to react chemically with said anode, comprising a layer of a compressible foraminous textile material covering said anode and having a coating of a hygroscopic starch gel, said starch gel filling the foramina in said material, said starch gel being formed from a mixture of starch and an aqueous solution of an electrolyte compatible with the electrochemical system of said battery.

14. A bibulous separator for a dry cell battery having a hollow cylindrical metallic anode and a quantity of battery mix intended to react chemically with said anode comprising a layer of a cotton gauze material covering both sides and one end of said anode and having a coating of a hygroscopic starch gel on both sides of said material, said gel filling the interstices of said material.

15. A bibulous separator as set forth in claim 14 comprising an additional layer of cotton gauze material directly overlying the first said layer, said additional layer having a coating of said gel on both sides thereof and filling the interstices of the material of said second layer.

16. A dry cell battery, comprising a carbon cup having a hollow body, a closed end and an open end, a carbon rod projecting from said closed end and disposed generally along the longitudinal axis of said cup and being electrically connected thereto, said cup and said rod forming a cathode structure, a hollow cylindrical metallic anode disposed between said rod and said cup, closure means for said open end of said cup, said closure means a circular metallic disk electrically connected to said anode, battery mix contained in the space between said anode and said cup and said rod to react chemically with said anode when said anode and said cathode structure are electrically connected through an external circuit, said chemical reaction producing a substantial increase in the volume of said anode thereby producing a transverse stress tending to rupture said cup, reinforcing means surrounding said body of said cup and arranged to resist the rupturing force exerted on said body upon said increase in volume of said anode, said reinforcing means comprising a wrapping of adhesive coated fiberglass tape wound around the body of said cup, and a bibulous separator covering said anode and arranged to prevent direct contact between said anode and said mix, said bibulous separator comprising a layer of a compressible, foraminous textile material coated on both sides and having the foramina filled with a starch gel, said bibulous separator having a thickness sufficient so that compression thereof resulting from expansion of said anode accommodates at least a substantial proportion of said transverse stress.

17. A dry cell battery as set forth in claim 16 in which said fiberglass tape extends axially beyond said cup body at both ends of said battery, the axial extension at one end being folded inwardly to overlie the radially outer edge portion of said cup closed end and the axial extension at the other end being folded inwardly to overlie the radially outer edge portion of said metallic disk.

18. A dry cell battery as set forth in claim 17, comprising a first annular insulating washer overlying said axial extension at said one end and contacting said closed end; and a second annular insulating washer overlying said axial extension at said other end and contacting said disk.

19. A dry cell battery as set forth in claim 18, comprising a reinforcing metal jacket surrounding said fiberglass tape and having an annular flange extension at each end, each flange extension contacting a respective one of said annular washers.

References Cited by the Examiner
UNITED STATES PATENTS

| | | | |
|---|---|---|---|
| 627,917 | 6/99 | Fuld | 136—107 |
| 2,539,318 | 1/51 | Orsino | 29—204 |
| 3,046,649 | 7/62 | Brennan | 29—474.3 |

WINSTON A. DOUGLAS, *Primary Examiner.*